Oct. 24, 1967    G. E. ZIEGLER    3,349,017
METHOD AND STRUCTURE OF CATHODICALLY PROTECTING
METALLIC CASINGS OF HEAT DISTRIBUTION SYSTEMS
Filed May 2, 1966    3 Sheets-Sheet 3
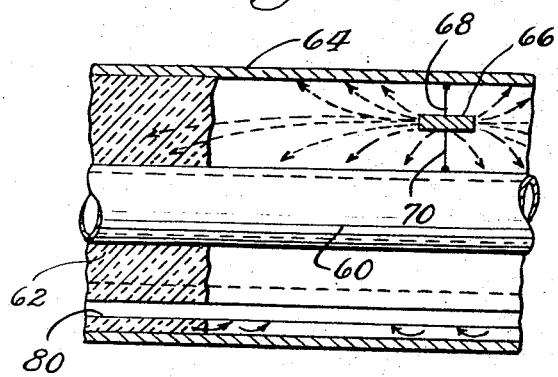
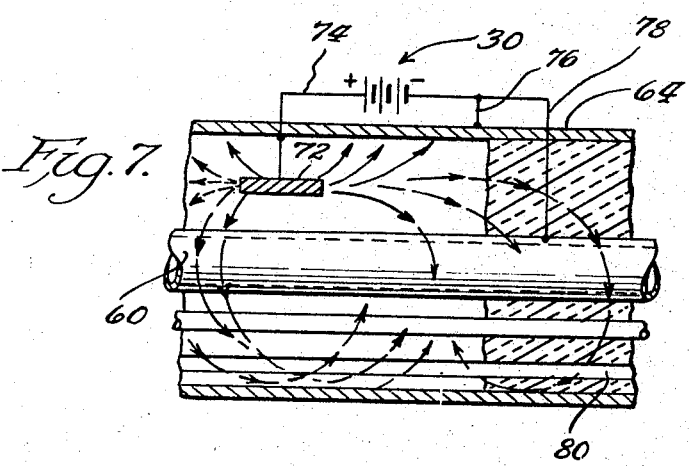
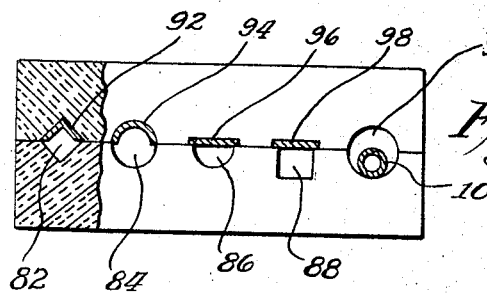
Inventor
George E. Ziegler
By Mann, Brown & McWilliams
Attys.

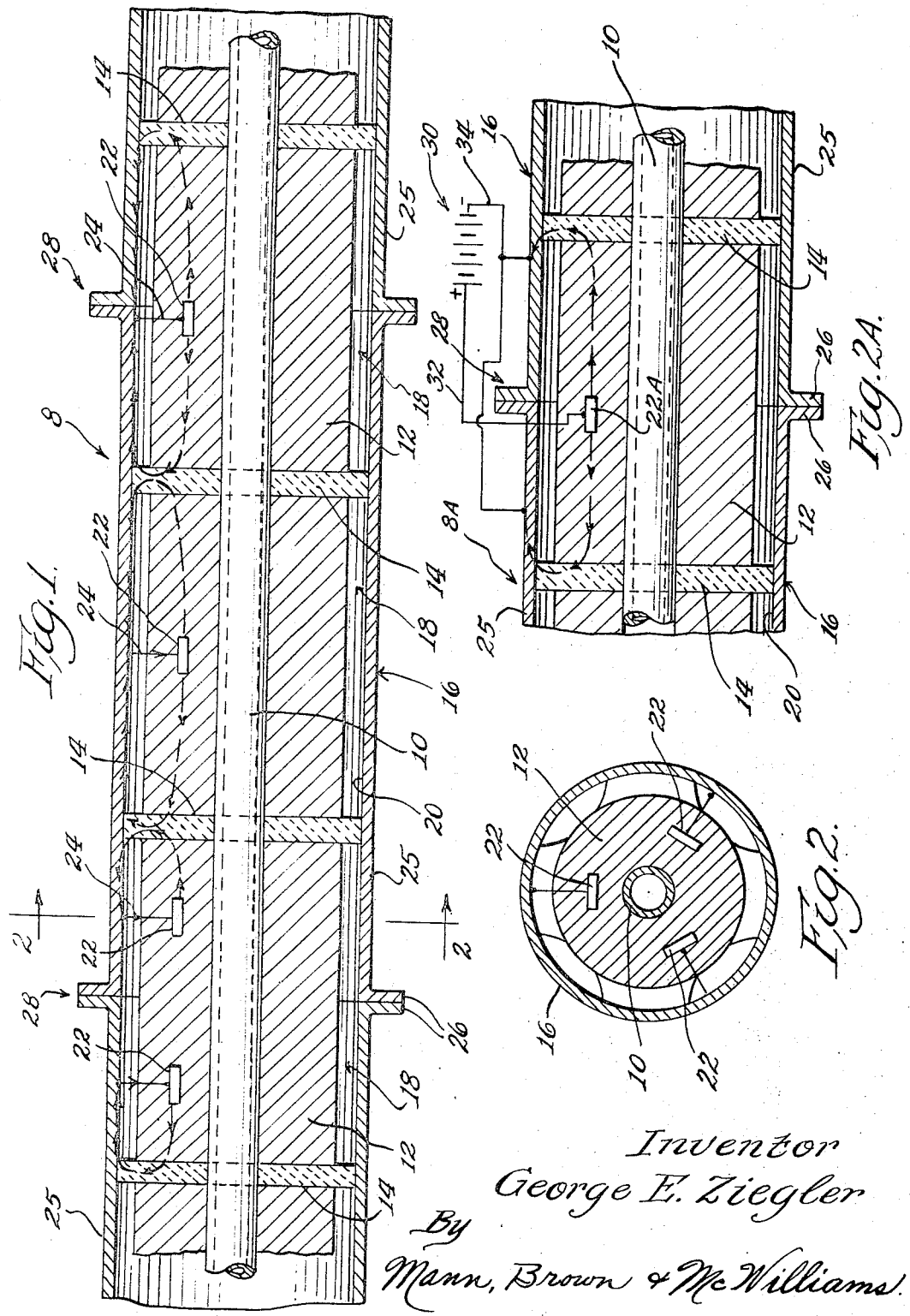

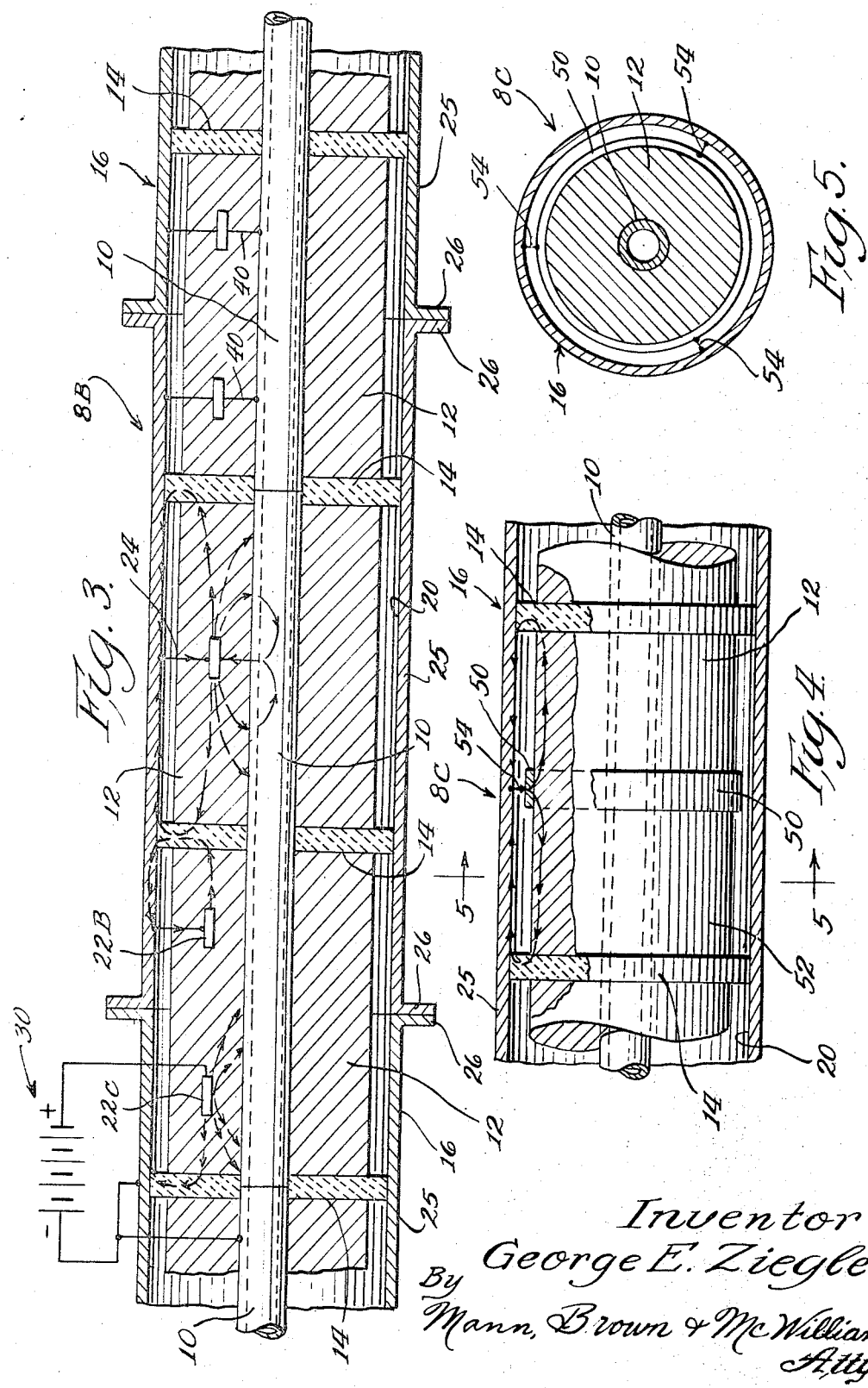

United States Patent Office 3,349,017
Patented Oct. 24, 1967

3,349,017
METHOD AND STRUCTURE OF CATHODICALLY PROTECTING METALLIC CASINGS OF HEAT DISTRIBUTION SYSTEMS
George E. Ziegler, Evanston, Ill., assignor to Concrete Thermal Casings, Inc., a corporation of Washington
Filed May 2, 1966, Ser. No. 546,835
9 Claims. (Cl. 204—147)

This application is a continuation-in-part of my copending application Ser. No. 211,231, filed July 20, 1962, now U.S. Patent No. 3,254,012, which is in turn a continuation-in-part of my application Serial No. 786,169, filed Jan. 12, 1959, now Patent No. 3,045,708, granted July 24, 1962 (the entire disclosures of both of said applications being incorporated herein by this reference).

My invention relates to corrosion prevention systems, and more particularly to the prevention of corrosion in metallic casings used in heat distribution systems.

My above referred to application discloses methods for cathodically protecting metallic conduiting or piping used in heat distribution systems which provides effective protection for the conduiting.

However, many types of heat distribution systems are provided with metallic casings that enclose the conduiting or piping and its heat insulating covering, and while some prior art efforts have been made to protect the casing with electrodes applied externally of the casing, the corrosion problem has still persisted insofar as the casing is concerned. The problem has been, my studies have revealed, that external electrodes actually provide no protection for the inner surface of the casing as corrosion of the casing inner surface has been a continuing problem in spite of the use of externally located electrodes.

The problem that this invention solves arises from the fact that any inhomogeneity of conditions insofar as a particular piece of metal is concerned, such as in connection with temperature gradients, material distribution, moisture conditions, etc., results in a difference of potential being established between areas of the metal being compared, whereby in the presence of moisture, one area becomes an anode and the other a cathode, resulting in a local electrolysis under the action of which the anodic area tends to dissolve or corrode under the galvanic action involved.

In the case of heat distribution systems provided with metallic casings, every point of contact of the casing with the insulating material covering the piping, as well as with spacers or the like that may be involved, provides a probable casing corrosion area. The likelihood of corrosion in the case of the casing is increased by the fact that the temperatures of the medium being distributed tend to heat up the pipe and its surrounding insulating material, thereby tending to concentrate any moisture in the insulating material at the radially outward portion thereof.

Furthermore, the temperature of the soil or other mediums surrounding the casing is ordinarily a good deal cooler than the temperatures inside the casing, with the result that water vapor inside the casing tends to condense on the inside surface thereof, thereby providing conditions conducive to maximum galvanic corrosion.

A principal object of my invention is to provide methods and devices of cathodically protecting the inside surfaces of heat distribution metallic casings.

Another principal object of my invention is to provide an improved cathodic protective system for heat distribution system metallic casings that acts only when protection is required, and which is inactivated under conditions and during those periods when protection is unnecessary.

Still other objects of the invention are to provide a cathodic protection system in which the insulating materials surrounding the conduiting constitutes an electrical element or component of the protective circuit, to provide a sacrificial anode assembly suitable for application inside the casing for selectively regulating the current flow that opposes corrosion, to provide impressed current electrode arrangements suitable for application inside the casing for providing a current flow that opposes corrosion, and to provide methods and devices for cathodically protecting metal casings of heat distribution systems from the inside thereof that are economical of manufacture, convenient to install and use, and fully effective on a long term basis required for economical utilization of heat distributions of the type to which the invention relates.

Other objects, uses, and advantages will be obvious or become apparent from a consideration of the following detailed description and the application drawings.

In the drawings:

FIGURE 1 is a longitudinal cross-sectional view through one form of heat distribution system arranged in accordance with this invention;

FIGURE 2 is a transverse cross-sectional view along line 2—2 of FIGURE 1;

FIGURE 2A is a view similar to that of FIGURE 1 but illustrating a modified electrode arrangement;

FIGURE 3 is a view similar to that of FIGURE 1 illustrating further modifications of the invention;

FIGURE 4 is a view similar to that of FIGURES 1 and 3 illustrating another modification of the invention;

FIGURE 5 is a transverse cross-sectional view substantially along line 5—5 of FIGURE 4;

FIGURES 6 and 7 are longitudinal sectional views similar to those of FIGURES 1 and 3 but illustrating further applications of the invention; and FIGURE 8 is a transverse sectional view of thermal insulation material and showing several possible shapes or forms of evaporative channels useful in connection with the invention and also several ways in which appropriate electrode materials, when used in the evaporative channels either as partial forms or otherwise, may be made a part of the cathodic protective system (this figure is purely diagrammatic and is not intended to show the entire conduit structure).

However, it is to be understood that the specific drawing illustrations provided are supplied to comply with the requirements of 35 U.S.C. 112, and that the invention may have other specific embodiments that will be obvious to those skilled in the art.

FIGURES 1 and 2 illustrate one type of heat distribution system conduit structure 8 to which my invention has been applied, in which a pipe or conduit 10 is covered with prefabricated sleeves 12 formed from a suitable thermal insulation material with the sleeves 12 being separated by spacers 14 and the pipe 10 and its insulating sleeves 12 and spacers 14 being enclosed within metallic casing 16.

The structural arrangement in FIGURES 1 and 2 thus provides an annular spacing 18 between the respective sleeves 12 and the casing 16 along the length of which corrosion of the inner surface 20 of the casing 16 is minimized because of lack of contact with the insulating material. However, the spacers 14 are proportioned so that opposed portions of their peripheries substantially complement the internal surface 20 of casing 16, and experience has shown that lacking my invention, galvanic corrosion will occur at the areas of contact between the spacers 14 and the casing surface 20.

In accordance with this invention, the individual insulating sleeves 12 are each provided with one or more electrodes 22 positioned within the insulating material and electrically connected to the conduit 16 by a suitable connector 24.

The electrodes may be distributed about the transverse cross section of each sleeve in the manner indicated in FIGURE 2, and in the embodiment of FIGURES 1 and 2, the electrodes 22 are of the sacrificial electrode type. In other words, the electrodes 22 should be formed from a metal or alloy thereof which is higher in the electromotive series than the material from which the casing 16 is formed. In practice, casing 16 is ordinarily formed from iron, and consequently the anode forming electrodes 22 may be zinc, aluminum, magnesium or alloys of these materials with one another.

In practical application, the conduit structure 8 is supplied in the form of lengths of pipe or conduit 10 and casing 16 that are of predetermined length, and which may be assembled together, in the field, with their co-operating insulating sleeves and spacers 14, or the individual units of piping may be assembled at the factory to define preassembled sections. In any event, the consecutive lengths of piping 10 are secured together in end to end leak-free relation in any suitable manner to form the conduit for the fluid to be conveyed, and the insulating sleeves, spacers and the casing sections are applied in the manner indicated, with the flanged ends 26 of the individual casing sections 25 being secured together in any suitable manner (as by welding) to form a leak-free joint.

In operation, cathodic protection current flows in the respective paths indicated in FIGURE 1, and thus between the respective electrodes, the casing, and the intervening portions of the spacers, only under conditions such that the moisture in the insulation material and on or in the spacers renders the insulation and spacers conductive, and permits the flow of current. Since the problem of corrosion exists only when moisture is present in the insulation and on or in the spacers, there will be a flow of cathodic protection current only when there is a need for such protection.

The electrodes 22 may be arranged in various ways to accomplish the purposes of the invention, some of which are indicated in FIGURES 1 and 2. Thus, in connection with the insulating sleeves that are positioned intermediate the flanged ends 26 of a casing section 25, the electrodes may be positioned intermediate the ends of the insulating sleeve, and thus provide the resulting cathodic protection current flow indicated at the mid portion of FIGURE 1. In the case of the insulating sleeves that span a joint 28 of casing 16, the electrodes of this sleeve may be disposed to be positioned on either side of the joint, as indicated at the left hand end of FIGURE 1, or the insulating sleeve may be provided with one or more electrodes positioned to be disposed adjacent to but to one side of the joint, as indicated at the right hand end of FIGURE 1.

As indicated at FIGURE 2A, instead of using the sacrificial electrode arrangement, an impressed current system may be provided in connection with the general type of distribution system illustrated in FIGURES 1 and 2. This is illustrated in FIGURE 2A in which the conduit structure is indicated at 8A and parts corresponding to those illustrated in FIGURES 1 and 2 are provided with corresponding reference numerals.

In this arrangement, the electrodes 22A may be formed from a relatively inert metal or alloy thereof, or a nonmetallic conductor, and where the casing 16 is formed from a ferrous material, the electrodes 22A may be formed from carbon. In any event, the electrode and casing 16 are incorporated in a circuit which includes a suitable source of DC voltage, such as battery 30, which is connected by appropriate leads 32 and 34 to the electrodes 22A and casing respectively, resulting in the current flow illustrated by FIGURE 22A. Of course, the source of DC voltage may be a low voltage alternating current transformer associated with a suitable rectifier, a direct current generator, or any other current source capable of supplying unidirectional current, all well known to those skilled in the art.

In the embodiments of FIGURES 1–2A, the insulating material may be prefabricated sections of the light weight insulating concrete specified in my said application Ser. No. 211,231, or may be formed from calcium silicate, Fiberglas or any insulating medium. The spacers 14, known in the art as "spiders," may be formed from a suitable ceramic material.

In the embodiment of FIGURE 3, in which parts that are the same as shown in FIGURES 1 and 2 are given similar reference numerals, the electrodes 22B are the same as electrodes 22 but they are also connected to the conduit 10 by suitable connectors 40. Assuming that the electrodes 22B have the proper relation on the electromotive scale with respect to the conduit or piping 10, the piping 10 will also have the benefit of the cathodic protection current flow that is contemplated by this invention, as illustrated by the current flow diagrams of FIGURE 3. Instead of the sacrificial electrodes 22B, an impressed current system may be employed as indicated at the left hand end of FIGURE 3 in which the electrode 22C is formed from carbon, and this electrode and the pipe 10 and casing 16 are connected in a suitable direct current circuit in which the source of direct current may be battery 30 or any other suitable current supplying means or device, as disclosed in my said copending application Ser. No. 211,231.

The electrodes need not be embedded in the insulating material, as indicated by the embodiment of FIGURES 4 and 5, in which the electrodes are in the form of circular bands 50 applied to the exterior surface 52 of the individual sleeves 12. Appropriate connectors 54 connect the respective bands 50 to the casing 16, and the bands 50 are formed from a suitable sacrificial electrode providing material such as those specified above. When moisture conditions are conducive to corrosive galvanic action, the cathodic protection current flow contemplated by this invention is automatically provided and provides the current flow illustrated by FIGURE 4.

The spiders 14 may have any convenient shape known to the art and conventionally they are provided with openings about their peripheries in some convenient shaping arrangement to provide for air displacement on installation.

The principles of this invention may also be applied to poured in place systems, such as those indicated in FIGURES 6 and 7 in which conduit 60 is embedded in thermal insulation material 62 that is provided with a metallic casing 64. In such an arrangement, the pipe lengths that are to form the conduit 60 are welded together and pressure tested for leakage after which the insulating material, which may be the concrete specified in my said application Serial No. 211,231, is poured in place about the assembled conduit 60. The casing 64 may be conveniently formed in sections for application about the insulating material after the insulating material has been formed in any suitable manner known to the art.

In accordance with this invention, the insulating material 62 includes one or more electrodes 66 which in the form of FIGURE 6 are of the sacrificial type and are connected to both the casing 64 and the conduit 60 by appropriate leads 68 and 70, respectively, resulting in the cathodic protection current flow pattern illustrated in FIGURE 6 when moisture conditions are conducive to providing such a current flow.

In the embodiment of FIGURE 7, an impressed current system is employed and the electrodes 72 may be formed from carbon or the like, with the pipe 60 and casing 64 being incorporated in a direct current circuit that for illustrative purposes only is shown as providing a battery 30 connected by appropriate leads 74, 76 and 78 to the electrode pipe 60 and casing 64, respectively.

As disclosed in my said copending application Ser. No. 211,231, the insulating material 62 may be formed with one or more air circulation channels 80 which facilitate removal of moisture that may be present in the insulating material. Air may be circulated through these channels either by means of natural draft or by means of forced ventilation. Reference may be had to my said Patent 3,045,708 for a complete discussion of the role and function of channels 80, and as indicated in diagrammatic FIGURE 8, they may be of any suitable cross-sectional configuration as indicated at 82, 84, 86, 88 and 90. As disclosed in my said application Ser. No. 211,231, where metal forms 92, 94, 96 and 98 are used in producing these channels or vents, they may be left in place and in accordance with this invention they may be formed of appropriate electrode material to provide a cathodic protective system of the type contemplated by this invention. Thus, these forms should be made from metals which are electropositive with respect to the material from which the conduit structure casing is formed (which ordinarily is a ferrous material), and they should be electrically connected to the casing at spaced intervals to become a part of the cathodic protective system of the sacrificial electrode type for the casing. The forms may also be connected to the heating pipe to provide cathodic protection for that as well.

As also indicated in FIGURE 8, the electrode may be in the form of a continuous pipe or member 100 inserted in one or more of the channels 90 and appropriately connected at spaced intervals to the heating pipe and/or the casing for providing the cathodic protection. This arrangement has the important advantage that the electrode 100 may be replaced if and when replacement becomes necessary, though it would be necessary that sliding contacts be provided that are connected with the rest of the cathodic protection electrical system.

If the cathodic protection is to be of the impressed voltage type for the various arrangements suggested by FIGURE 8, of course the electrode materials may be selected accordingly as previously described.

It will therefore be seen that I have provided a cathodic protection system for protecting metallic casings of heat distribution systems which protects the heretofore unprotectable casing inside surface while at the same time providing for protection of the heat medium conducting conduit as well, if so desired. In the latter case, as the heat transfer from the heat medium conducting conduit drives the moisture radially outwardly of the conduit and its insulating material, the protective system for the conduit will automatically be turned off and remain off as long as the insulation between the electrode and the pipe remains dry. When the entire insulation has dried out the cathode protecting circuit automatically opens.

However, when moisture again permeates the insulating material, the cathodic protection system automatically is turned on and protects the portion of the conduit structure that is exposed to moisture.

While my invention is especially adapted for use in connection with heat distribution systems, it is readily applicable to any dual temperature fluid transfer system, such as cold water distribution systems that are dried out by being heated. The term "heat distribution system" or its equivalent as used in the appended claims is intended to mean such systems.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. The method of protecting a metallic casing, of a heat distribution system that includes a pipe adapted to carry a heated fluid therethrough, from the corrosive deteriorating effects of moisture within the casing, which method comprises:

surrounding the pipe with the casing and a layer of thermally insulating material interposed between the pipe and the casing that is characterized by having good dielectric properties when dry but having some electrically conducting properties when wet, and that is further characterized by having at least one electrode in contact with the insulating material in radially spaced relation to the casing, and operatively distributed along the length of the pipe, with means associated therewith for making the casing the cathodic portion and the electrodes the anodic portion of a cathodic protecting system, and circulating a heated fluid through the pipe to cause moisture within the thermally insulating material to be driven radially outwardly toward the casing to thereby open circuit the cathodic protective system, whereby when the heat distribution system is first installed and before the circulation of heated fluid therethrough, and when the circulation of the heated fluid may be seasonably terminated thereby causing redistribution of moisture within the thermal insulating material, and when moisture may otherwise reach the proximity of the inner surface of said casing, the cathodic protection system provides continual protection for the casing internal surface against corrosion.

2. The method of protecting a metallic casing, of a heat distribution system that includes a pipe adapted to carry a heated fluid therethrough, from the corrosion deteriorating effects of moisture within the casing, which method comprises:

encasing the pipe within the casing and thermally insulating material interposed between the pipe and the casing that is characterized by having good dielectric properties when dry but having some electrical conducting properties when wet, which encasing includes mounting at least one electrode in contact with the insulating material in radially spaced relation to the casing, and operatively distributed along the length of the pipe, with means associated therewith for making the casing the cathodic portion and the electrodes the anodic portion of a cathodic protection system, and circulating a heated fluid through the pipe to cause moisture within the thermally insulating material to be driven radially outward toward the casing to thereby open circuit the cathodic protective system, whereby when the heat distribution system is first installed and before the circulation of heated fluid therethrough, and when the circulation of the heated fluid may be seasonably terminated thereby causing redistribution of moisture within the thermal insulating material, and when moisture may otherwise reach the proximity of the inner surface of said casing, the cathodic protection system provides continual protection for the casing internal surface against corrosion.

3. The method set forth in claim 2 wherein the casing is made of ferrous material and in which the cathodic protective system is of the sacrificial electrode type with the electrodes being made of a metal which is electropositive with respect to the material of the casing.

4. The method set forth in claim 2 wherein a direct current is impressed on the electrode from a source located exterior of the casing.

5. The method of protecting a metallic casing, of a heat distribution system that includes a pipe adapted to carry a heated fluid therethrough, from the corrosive deteriorating effects of moisture within the casing, which method comprises:

covering the pipe with thermally insulating material that is characterized by having good dielectric characteristic properties when dry but having some electrical conducting properties when wet, enclosing the insulating material within the casing including mounting at least one electrode in contact with the insulating material in radially spaced relation to the casing, and operatively distributed along the length of the pipe, with means associated therewith for making the casing the cathodic portion and the electrodes the anodic portion of a cathodic protective system, and circulating a heated fluid through the pipe to cause moisture within the thermally insulating material to be driven radially outwardly toward the casing to thereby open circuit the cathodic protective system, whereby when the heat distribution system is first installed and before the circulation of heated fluid therethrough, and when the circulation of the heated fluid may be seasonably terminated thereby causing redistribution of moisture within the thermal insulating material, and when moisture may otherwise reach the proximity of the inner surface of said casing, the cathodic protection system provides continual protection for the casing internal surface against corrosion.

6. The method of making a prefabricated section for a heat distribution system that includes a pipe length enclosed in a metallic casing, to provide for cathodically protecting the casing from the corrosive deteriorating effects of moisture within the casing, which method comprises:

taking the pipe length and placing over it a sleeve of insulating material that is characterized by having good dielectric characteristics when dry but having some electrical conducting characteristics when wet, and mounting at least one electrode in contact with the insulating material in radially spaced relation to the casing, and operatively distributed along the length of the pipe, applying the casing over the insulating material and electrically connecting the casing and the electrode into a cathodic protective system.

7. The method of protecting a metallic casing, the heat distribution system that includes a pipe adapted to carry a heated fluid therethrough, from the corrosive deteriorating effects of moisture within the casing, which method comprises:

taking prefabricated sections made by the method of claim 6 and connecting them together to form the heat distribution system, and circulating a heated fluid through the pipe to cause moisture within the thermally insulating material to be driven radially outward toward the casing to thereby open circuit the cathodic protective system of each section, whereby when the heat distribution system is first installed and before the circulation of heated fluid therethrough, and when the circulation of the heated fluid may be seasonably terminated thereby causing redistribution of moisture within the thermal insulating material, and when moisture may otherwise reach the proximity of the inner surface of said casing, the cathodic protection system provides continual protection for the casing internal surface against corrosion.

8. A cathodically protected heat distribution system comprising in combination:

a heat distribution system including a fluid impervious pipe adapted to carry a heated fluid in said heat distribution system, a jacket of moisture permeable, normally electrically non-conductive, thermally insulating material encircling said pipe, and thermally insulating said pipe from its surrounding environment, said insulating material being non-conductive when dry but responsive to moisture present therein to become electrically conductive, a casing encircling said insulating material and being formed from a metallic substance, and an anode electrically connected to said insulating material and said casing in a cathodic protection current supplying system, whereby the presence of moisture in said insulating material renders said insulating material electrically conductive to complete a cathodic protection system to render said casing cathodic to protect said casing from corrosive electrolytic attack.

9. The method of protecting a metallic casing and a metallic pipe, of a heat distribution system in which the pipe is adapted to carry a heated fluid therethrough, from the corrosive deteriorating effects of moisture within the casing, which method comprises:

surrounding the pipe with the casing and a layer of thermally insulating material interposed between the pipe and the casing that is characterized by having good dielectric properties when dry but having some electrically conducting properties when wet, and that is further characterized by having at least one electrode in contact with the insulating material in radially spaced relation to the casing and the pipe, and operatively distributed along the length of the pipe and the casing, with means associated therewith for making the casing and the pipe the cathodic portion and the electrodes the anodic portion of a cathodic protecting system, and circulating a heated fluid through the pipe to cause moisture within the thermally insulating material to be driven radially outwardly toward the casing to thereby open circuit the cathodic protective system, whereby when the heat distribution system is first installed and before the circulation of heated fluid therethrough, and when the circulation of the heated fluid may be seasonably terminated thereby causing redistribution of moisture within the thermal insulating material, and when moisture may otherwise reach the proximity of the inner surface of said casing or the exterior surface of the pipe, the cathodic protection system provides continual protection for the casing internal surface and pipe exterior surface against corrosion.

References Cited

UNITED STATES PATENTS

| Re. 22,988 | 3/1948 | McLeish | 138—149 |
| 669,992 | 3/1901 | Gottlob | 204—196 |
| 1,867,984 | 7/1932 | Pistor | 204—147 |
| 2,020,844 | 11/1935 | Magos et al. | 204—197 |
| 2,324,181 | 7/1943 | Tulien | 138—149 |
| 2,491,225 | 12/1949 | Stearns | 204—196 |

JOHN H. MACK, *Primary Examiner.*

T. TUNG, *Assistant Examiner.*